US 7,079,640 B2

(12) United States Patent
Mikhailov et al.

(10) Patent No.: US 7,079,640 B2
(45) Date of Patent: Jul. 18, 2006

(54) METHOD AND APPARATUS FOR IMPLEMENTING AN EXTENSIBLE RANGE OF COMMUNICATIONS SERVICES IN TELEPHONE NETWORKS

(75) Inventors: Vladimir V. Mikhailov, Nepean (CA); Christian Constantinof, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 981 days.

(21) Appl. No.: 09/742,419

(22) Filed: Dec. 22, 2000

(65) Prior Publication Data
US 2002/0080949 A1 Jun. 27, 2002

(51) Int. Cl.
*H04M 7/00* (2006.01)

(52) U.S. Cl. .................... 379/230; 379/88.17; 370/352
(58) Field of Classification Search ........... 379/230, 379/221.15, 219, 88.17; 307/352–356
See application file for complete search history.

(56) References Cited

U.S. PATENT DOCUMENTS

| 5,850,433 | A | * | 12/1998 | Rondeau ................. 379/218.01 |
| 5,884,262 | A | * | 3/1999 | Wise et al. ............... 704/270.1 |
| 5,923,659 | A | | 7/1999 | Curry et al. ................. 370/401 |
| 5,940,598 | A | | 8/1999 | Strauss et al. .......... 395/200.79 |
| 5,999,525 | A | | 12/1999 | Krishnaswamy et al. ... 370/352 |
| 6,282,275 | B1 | * | 8/2001 | Gurbani et al. ......... 379/142.06 |
| 6,421,674 | B1 | * | 7/2002 | Yoakum et al. ............... 707/10 |
| 6,512,818 | B1 | * | 1/2003 | Donovan et al. ......... 379/88.18 |
| 6,735,621 | B1 | * | 5/2004 | Yoakum et al. ............. 709/218 |
| 6,765,912 | B1 | * | 7/2004 | Vuong ..................... 370/395.2 |
| 6,778,653 | B1 | * | 8/2004 | Kallas et al. ........... 379/201.02 |

* cited by examiner

*Primary Examiner*—Fan Tsang
*Assistant Examiner*—Simon Sing
(74) *Attorney, Agent, or Firm*—Mark J. Sprigings; Ogilvy Renault LLP

(57) ABSTRACT

Service features are enabled in a next generation telephone network using a content/service provision node and subscriber access control equipment enabled to deliver content and/or service feature messaging to associated subscriber lines.

30 Claims, 5 Drawing Sheets

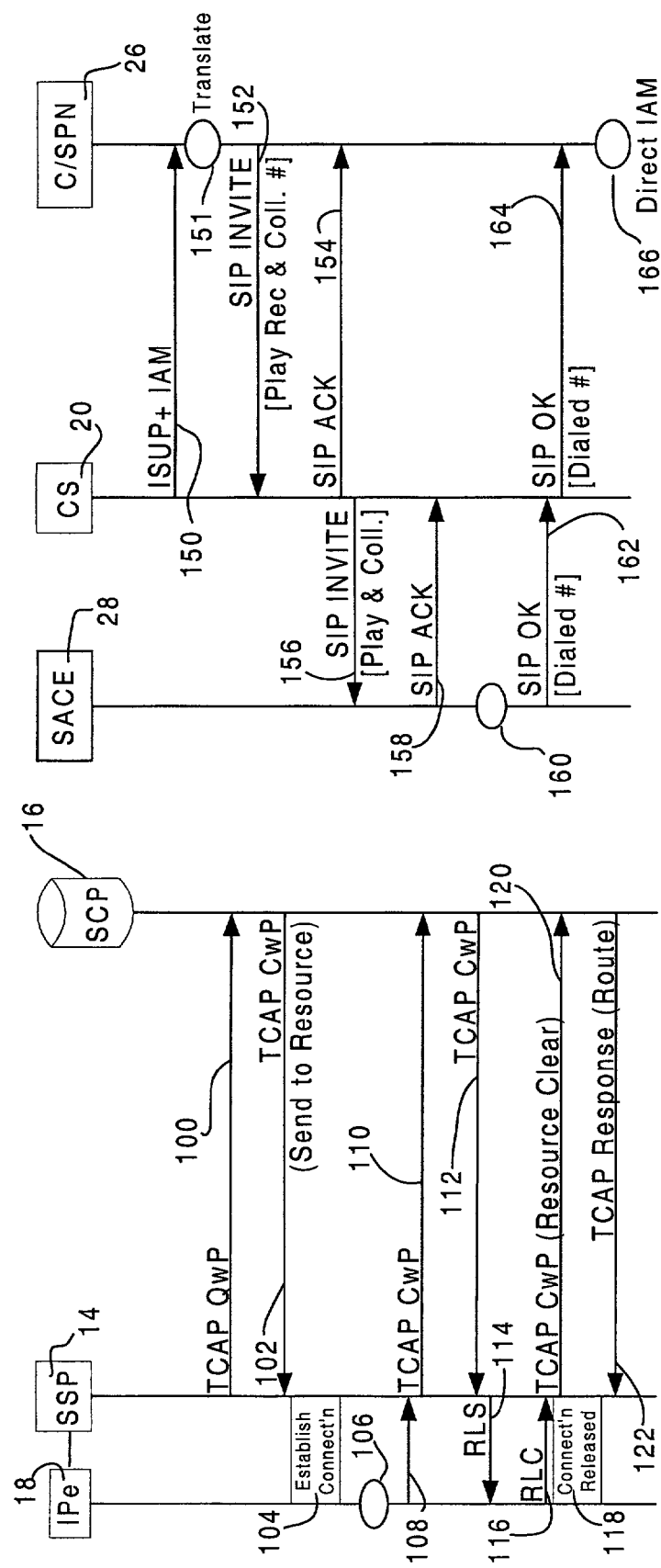

METHOD AND APPARATUS FOR IMPLEMENTING AN EXTENSIBLE RANGE OF COMMUNICATIONS SERVICES IN TELEPHONE NETWORKS

CROSS-REFERENCE TO RELATED APPLICATIONS

This is the first application filed for the present invention.

MICROFICHE APPENDIX

Not applicable.

TECHNICAL FIELD

The present invention relates to the provision of service features in a telecommunications network, and, in particular, to the provision of an extensible set of service features with a service network that interconnects telephone service switches using a flexible, adaptable protocol.

BACKGROUND OF THE INVENTION

In order to remain competitive, telephone service providers must continually make available new service offerings and service features to subscribers. Implementing new features using the Common Channel Signaling (CCS) network has several limitations familiar to those skilled in the art.

A major hindrance to the provisioning of new service offerings and service features involves inherent limitations in the flexibility and extensibility of the CCS network. The CCS network in North America is a Signaling System 7 (SS7) network. The CCS network supports the establishment of two-party calls with Integrated Services Digital Network-User Part (ISUP) messaging and database queries with Transaction Capabilities-Application Part (TCAP) messaging.

The SS7 protocol was designed at a time when two-party call control was a primary focus of the designers. Because of the structure of the CCS network it can be expensive to enable new services that are dependent on common channel signaling. The SS7 signaling protocols conform to international standards that have limited flexibility. The number of CCS network elements that would have to be modified in order to improve flexibility and enable significant extensions to the protocol is prohibitive. Besides, parts of the CCS network are reported to be experiencing signaling congestion. Alleviating signaling congestion, and introducing content/service messaging are both difficult within the confines of the fixed 64 KB/s transmission rate of the CCS network. Furthermore, any functionality that requires the transfer of data at a rate greater than 64 KB/s cannot be realized within the CCS network.

Transaction Capability-Application Part (TCAP), and its derivative Intelligent Network-Application Part (INAP), are protocols used in the CCS network. TCAP and INAP messages are the traditional carriers of service feature functionality. TCAP and INAP suffer the same limitations as the other signaling protocols used in the CCS network. Apart from the fact that these signals are conveyed at 64 KB/s, they are also limited by their inflexibility. The TCAP and INAP messages are designed to facilitate the querying of databases and responding to the queries with call routing information. The content carried by a TCAP or INAP message cannot be extended, nor can an interpretation of a message's content be modified without substantially modifying many CCS network elements.

Of particular interest for the provision of content or services to subscribers, is the ability to remotely interface with the bearer channel of subscriber lines. However, the bearer network, whether circuit- or packet-switched, is the only network designed to access the bearer channel of a subscriber line. Since interaction with a subscriber requires access to the bearer channel of the subscriber's line, such functionality is not available to devices that access only the CCS network. Nor is such functionality available to elements of the bearer network, unless those devices can be remotely accessed from the call control channel.

The method currently used to enable interaction with subscribers during call processing uses Intelligent Peripherals, which are typically connected to service switching points (SSPs) by Integrated Services Digital Network (ISDN) trunks. Although Intelligent Peripherals (IPs) permit interaction with subscribers for the purpose of collecting information, useful in making call routing decisions, etc., their use has several disadvantages. In order to use the resources of IPs, a call must first be terminated to the IPs. After the information is collected, the calls to the IPs must be released and new calls initiated using routing information collected, without releasing the calling party. This is time consuming and requires a feature-rich SSP, as well as a complex network control element, such as a Service Control Point (SCP). Furthermore, the installation of IPs requires a great deal of circuit-switched resources that may be idle most of the time.

There therefore exists a need for flexible content/service messaging, to enable extensible service features, and content provision to telephone service subscribers. There also exists a need for a system to permit the provision of content or services to a telephone service subscriber that permits services or content to be delivered economically by directly accessing a bearer channel for the telephone service subscriber.

SUMMARY OF THE INVENTION

An object of the invention is to enable access to service feature functionality in concert with a new type of CCS network element using extensible service features and content messaging.

Another object of the invention is to provide a new type of CCS network element for accessing the bearer channel of subscriber lines to enable interaction with a telephone user during call progress.

Accordingly, the invention provides a content/service messaging network that enables a Content/Service Provision Node (C/SPN) of a broadband telephony network to employ an easily modified messaging protocol. The messaging protocol of this network is versatile and adaptable, permitting the expansion of content/service messaging between one or more C/SPNs and a plurality of Call Servers (CSs). The versatility and adaptability of content/service messaging facilitates the extension of service features and the provision of content, to telephone service subscribers. The content/service messaging network is configured to exchange SIP signaling, or signaling of any other suitably adaptable and flexible protocol. Each C/SPN is enabled to receive, transmit and process content/service messages. The C/SPNs initiate service features from respective centralized locations in both the CCS and content/service messaging networks.

The CSs may be configured to relay messages between C/SPNs and Subscriber Access Control Equipment (SACE). Alternatively, the CSs may translate between messages conforming to the content/service messaging network's protocol, and control signaling messages exchanged with SACE, if the control signaling is flexible and enables extensions similar to the content/service messaging.

Because SACE have access to the bearer channel of respective subscriber lines, SACE enables the provision of voice interaction functionality. A SACE may be a media gateway (MG) modified to perform the functions of an Intelligent Peripheral, in response to messaging originating in the C/SMN. That is, the SACE is adapted to, under the direction of control signaling messages from its CS, play announcements or other audio content and collect digits, or other PCM data, from the bearer channel of a subscriber line.

BRIEF DESCRIPTION OF THE DRAWINGS

Further features and advantages of the present invention will become apparent from the following detailed description, taken in combination with the appended drawings, in which:

FIG. 5 is a message flow diagram of the principal messages exchanged in the provision of a service feature using a "send to resource" transaction in accordance with the prior art;

FIG. 6 is a message flow diagram of the principal messages exchanged in the provision of a "send to resource" transaction, in accordance with the present invention.

It will be noted that throughout the appended drawings, like features are identified by like reference numerals.

DETAILED DESCRIPTION OF THE PREFERRED EMBODIMENT

The invention provides a method and system that enables the provision of content or services to telephone service subscribers using new network elements. Content or services are provided by directly accessing a subscriber bearer channel for content or service delivery. A content/service provision node connected to each of the common channel signaling network and a content/service messaging network controls content and service delivery. Subscriber access control equipment is controlled by the C/SPN to effect delivery of the content or service. An extensible messaging protocol such as Session Initiation Protocol (SIP) enables the rapid deployment of new services.

Figure 1:
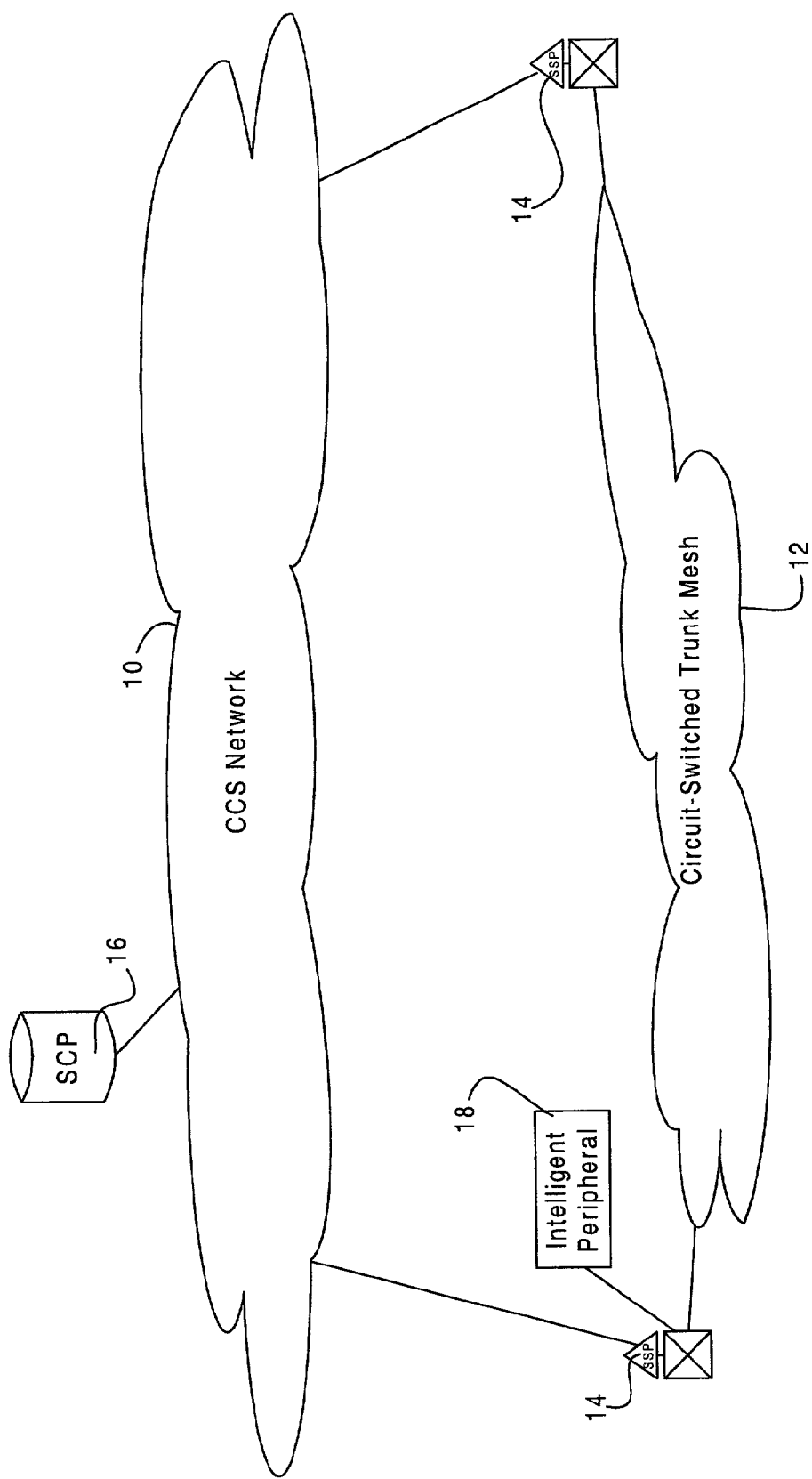
FIG. 1 is a schematic diagram of a prior art advanced intelligent network (AIN) illustrating devices involved in the provision of AIN functionality.

Prior art switched telephone networks, such as shown in FIG. 1, enable the provision of telephone service features to service subscribers. A common channel signaling (CCS) network 10, interconnects service switching points (SSPs) 14 and a Service Control Point (SCP) 16. The SSPs 14 are also connected to a Circuit-Switched Trunk Mesh 12.

An Intelligent Peripheral (IP) 18 is connected to one of the SSPs 14. The SSP 14 is enabled to connect subscriber lines to the Intelligent Peripheral 18. The Intelligent Peripheral 20 can play voice prompts to a connected subscriber, and receive Dual Tone Modulated Frequency (DTMF) signals from the subscriber telephone terminal. This enables the SSP to play announcements and collect digits when required during the provision of telephone services. The ways in which subscriber lines are connected to SSPs and to the Circuit-Switched Trunk Mesh, and CCS network, are known to those skilled in the art.

Figure 2:
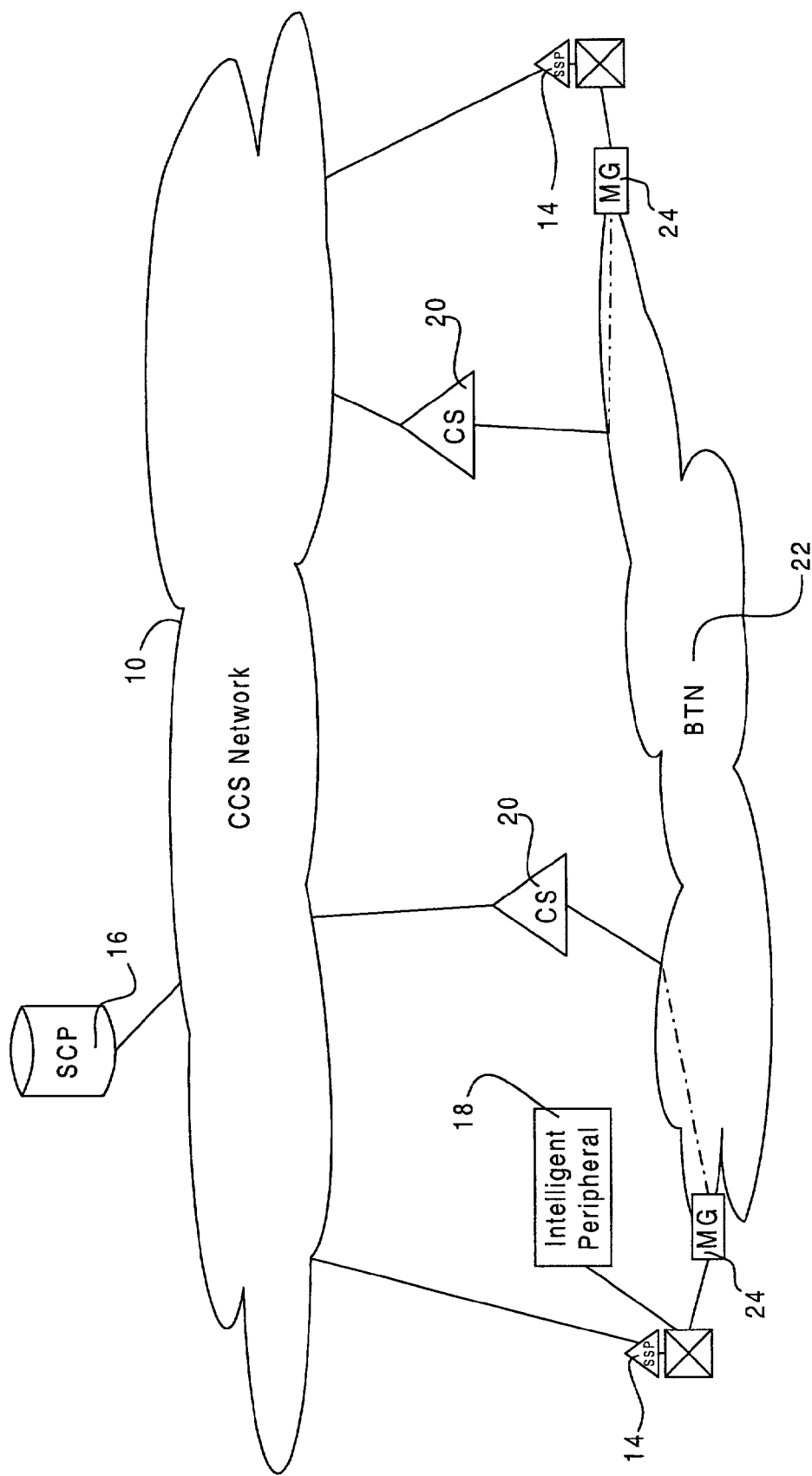
FIG. 2 is a schematic diagram of a prior art switched telephone network that uses a broadband transport network for inter-switch trunking, illustrating devices involved in the facilitation of IN/AIN service features.

In network configurations, such as those described in applicant's co-pending U.S. patent application Ser. No. 09/158,855 entitled TRANSIT TRUNK SUBNETWORK SYSTEM, which was filed on Sep. 23, 1998 and U.S. patent application Ser. No. 09/702,776 filed Nov. 1, 2000 entitled DISTRIBUTED TELEPHONE SERVICE SWITCH AND METHOD OF USING SAME, which are incorporated herein by reference, the high bandwidth of a broadband transport network is leveraged to increase capacity of the PSTN. As illustrated in FIG. 2, the Circuit-Switched Trunk Mesh is replaced by, or augmented with, a Broadband Transport Network (BTN) 22 which performs virtual trunking of bearer-channel PCM data. A Call Server (CS) 20 performs virtual trunk control in the BTN and controls the virtual trunk side of Media Gateways (MGs) 24. The coordination of the trunk side and the switch-side of a MG 24 is accomplished using CCS messaging between the CS and SSP associated with a MG. The BTN 22 may be an Internet Protocol (IP) network, an Asynchronous Transfer Mode (ATM) network or a Frame Relay (FR) network, for example.

A CS is a device or collection of devices that are connected to a BTN and a call control messaging network (such as the CCS network) for exchanging call control messages with other CSs. A CS also directs the set-up, monitoring, tear-down and caching of virtual trunks in the BTN to which it is connected, and controls the BTN operations of an associated set of MGs 24. If, for example, the CS is a Distributed Switch Call Manager (DSCM) described in Applicant's U.S. patent application Ser. No. 09/702,776, the CS will also be responsible for controlling the switch side of the MG 24, but this is not a necessary characteristic for the CS, for purposes of the present invention.

The MG 24 is a device that provides an interface between a switch fabric and the BTN 22. The MG 24 sets up, tears down, and caches virtual trunks through the BTN 22. The switch fabric may be a switch fabric of an SSP, or a component of the MG 24, in which case the MG 24 serves as a Line Gateway and it supports subscriber equipment directly. The switch fabric supports the connection and disconnection of any two peripherals, including subscriber telephone devices, trunk peripherals, Intelligent Peripherals 18 or connections to MGs 24.

Figure 3:
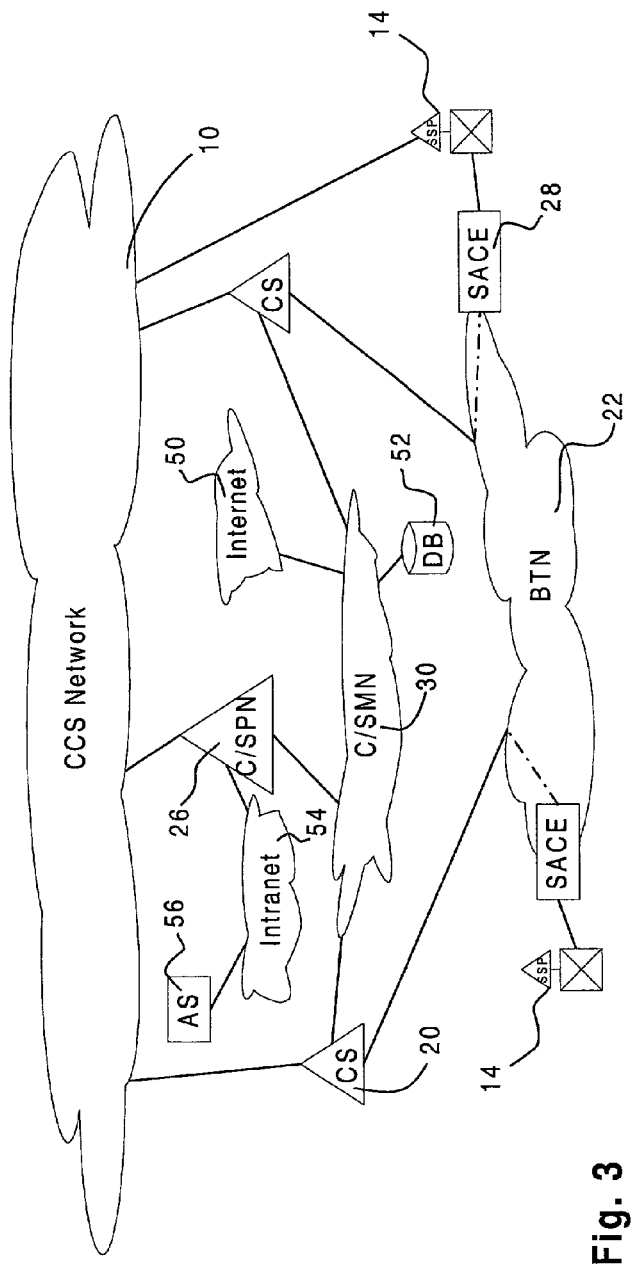
FIG. 3 is a schematic diagram of an embodiment of a network configured in accordance with the present invention.

In the embodiment of the invention illustrated in FIG. 3, a Content/Service Messaging Network (C/SMN) 30 supports a connection to a Service/Content Provision Node (C/SPN) 26, which controls and manages service and content provision to telephone service subscribers. The C/SPN 26 has a CCS network address, and receives CCS messages. The C/SPN 26 is also provisioned to exchange content/service messages via the C/SMN 30 with CSs 20. The CSs 20 in turn relay the content/service messages to an addressed Subscriber Access Control Equipment (SACE) 28.

The content/service messaging protocol is preferably Session Initiation Protocol (SIP). SIP, as defined in [RFC 2543], was designed to initiate multimedia sessions over IP networks. SIP is incomplete in ways that make it adaptable to different systems. The classification of message types in message headers, is a feature of SIP signaling systems, but the type classification is not a component of SIP itself. Rather an interchangeable, and up-gradeable, separate protocol component of SIP performs this function. As such, the number and types of signal classifications available for a SIP message is not predetermined, and specific classifications are easily modified. This separate component is important because it provides a method for modifying the interpretation of any field of a message of any type.

The types of signals passed through a packet signaling network that uses SIP, can be modified by updating a signal description set used for interpreting SIP messages. The most common signal description set for use on Internet Protocol (IP) networks is Session Description Protocol (SDP) [RFC 2327].

The network architecture shown in FIG. 3 can be provisioned by implementing modifications to a state-of-the-art, switched telephone network that includes CSs 20 interconnected by the BTN 22 and the CCS network 10, and MGs 24 interconnected by the BTN 22 and controlled by respective CSs 20. The provisioning involves: connecting the CSs 20 to a packet signaling network to permit content/service messaging (C/SMN), such as an Internet Protocol (IP) network; connecting the C/SPN to the C/SMN; converting the MGs 24 into SACE; and adapting CSs 20 to relay SIP content/service messages between SACEs 28 and the C/SPN 26. In one embodiment, an SACE 28 is an MG 24 that can access a bearer channel of subscriber lines to deliver content or a service directly to the subscriber, without the use of an Intelligent Peripheral 18, or the like. The SACE 28 must also support a flexible, extensible messaging protocol. If the control messaging protocol provisioned between an MG 24 and the CS 20 is not as adaptable as SIP, the MG 24 must be provisioned to support a flexible, extensible control messaging protocol before the MG 24 can serve as a SACE 28.

The C/SPN 26 is owned and operated, for example, by a content provider. Content can be retrieved from the C/SPN 26 or other sources, including: the public Internet 50, or any other network such as a content provider Intranet 54, an application server 56, or database 52. The content provider may be a telephone company, Internet service provider, communications service provider, or a messaging service provider, for example.

Figure 4:
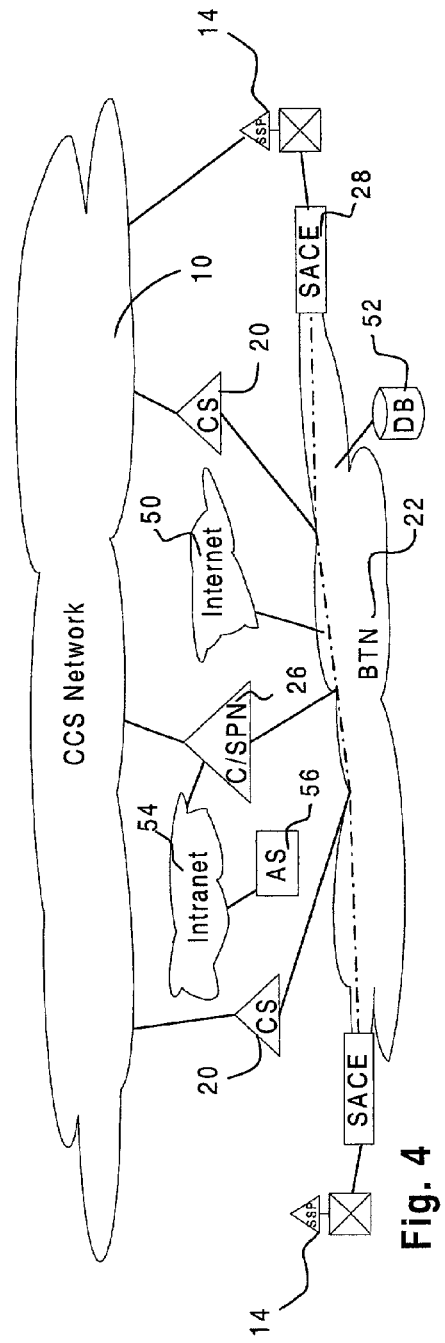
FIG. 4 is a schematic diagram of another embodiment of a network configured in accordance with the present invention.

The embodiment of the invention illustrated in FIG. 4 differs from that of FIG. 3 only to an extent that the BTN 22 is utilized for transferring content/service messages in addition to providing virtual trunking for bearer channel traffic.

The operation of the network for the provision of content and services requiring access to the bearer channel generally includes the following steps: a call control message, such as an Integrated Services Digital Network User Part (ISUP) CCS message, is received by the C/SPN 26; the C/SPN 26 translates the message to determine a content to be delivered or a service to be provided in response to receipt of the call control message; the C/SPN 26 sends a content/service message to a CS 20 associated with a SACE 28 delegated to provide the service because it has access to a bearer channel reserved for a call associated with the call control message; the CS 20 then forwards the content/service message or contents thereof to the addressed SACE 28; the SACE, in response, performs a specified operation or series of operations; and the CS 20 receives from the SACE 28 results of the operation(s) and/or a status report which it then returns to the C/SPN 26 in a content/service message.

In the embodiment described above, a messaging path is utilized that passes through the CS 20 associated with a SACE 28 designated to handle the bearer channel for a call associated with the content or service provision. It will be understood by those skilled in the art, however, that in the embodiment of the invention shown in FIG. 4, the content/service messages can be exchanged directly between the C/SPN 26 and the SACEs 28. This is enabled because BICC messages exchanged between the CSs 20 connected to the CCS network include a BTN 22 address of the SACE 28, which may be used by the C/SPN 26 for direct addressing of content/service messages, if the SACE 28 is provisioned to interpret those messages.

FIG. 5 is a schematic illustration of a prior art method of enabling voice interaction with subscribers in the provision of a service feature. In a "send to resource" TCAP transaction, an SCP 16 of the CCS network 10, in conjunction with an Intelligent Peripheral 18 controlled by the SCP 16, enables a service feature that involves requesting a calling party to select an item from a menu presented by voice prompts played to the subscriber by the Intelligent Peripheral 18. The calling party (not shown) dials a number that is received by the SSP 14. In step 100, the SSP 14 translates the dialed digits, which prompts it to formulate and send a TCAP Query with Permission (QwP) message to the SCP 16. In step 102, the SCP 16 translates the dialed digits, and directs the SSP 14 to send the call to a resource (the Intelligent Peripheral 18) in a TCAP Conversation with Permission (CwP) message. The SSP 14 therefore connects the calling party's subscriber line to the Intelligent Peripheral (step 104), and directs the Intelligent Peripheral to play the voice prompts. The Intelligent Peripheral plays the voice prompts and collects digits in step 106. The collected digits are relayed to the SSP 14 (step 108) and then to the SCP 16 (step 110). The SCP returns a TCAP CwP message containing a directive to clear the resource (step 112). The SSP 14 releases the connection to the Intelligent Peripheral 18 in steps 114, 116 and 118, and returns a resource clear TCAP CwP message to the SCP in step 120. The SCP then returns a TCAP Response message (step 122) directing the SSP 14 to terminate the call at a telephone address selected by the subscriber in response to the voice prompts played by the Intelligent Peripheral 18.

FIG. 6 is a message flow diagram of principal messages exchanged while providing the service feature described above with reference to FIG. 5, in accordance with the present invention. The features of this call are assumed to be similar to those of the message flow shown in FIG. 5.

In step 150, in response to the translation of a directory number received by a CS, the CS sends an ISUP-(BICC) Initial Address Message (IAM) to a C/SPN 26. As will be understood by those skilled in the art, the C/SPN 26 is a virtual CS 20 in the CCS network. Consequently, the translation tables for selected directory numbers associated with content or service provision can be adapted to route call control messages through the C/SPN 26 whenever one of those selected directory numbers is dialed by a subscriber. The C/SPN 26 translates a dialed number in the ISUP+IAM to determine a content or service that is associated with the dialed number (step 151). The translation indicates that a voice prompt menu is to be presented to the subscriber to permit the subscriber to select an option for completing the call. The C/SPN 26 responds by sending, via the content/service messaging network (CSMN) 30, in this example a SIP network, a SIP Invite message containing directives addressed to a SACE 28 indicated in the ISUP+IAM to have been selected to handle the call. In this example, the directives that the CS 20 conveys to the SACE 28 include instructions to play voice prompts and collect digits. The voice prompts may be stored at the SACE or, preferably, an audio file contained in the Invite message.

The Invite message is acknowledged (ACK) in step 154, and the CS 20 conveys the directives to the SACE 28 (step 156). The protocol for communications between CSs 20 and SACEs 28 must be compatible in extensibility with that of the content/service messaging network. Consequently, in this example, SIP is also used as the protocol for communications between the CS 20 and SACE 28.

The SACE acknowledges the Invite message (step 158) and effects the directives contained therein. The voice prompts are played and digits are collected in step 160. The collected digits are returned to the CS in a Success (OK) message, ending the SIP session between the CS and the SACE (step 162). The CS forwards the dialed digits to the C/SPN 26 in a second Success (OK) message (step 164). The C/SPN 26, after translating the collected digits (step 166), modifies a dialed number in the ISUP+ IAM it received in step 150, and sends the modified ISUP+ IAM message to a node in the CCS network determined by translating the new dialed number, to set up a call between the calling party and a termination determined by the selection from the menu performed by the subscriber in step 160.

Figure 7:
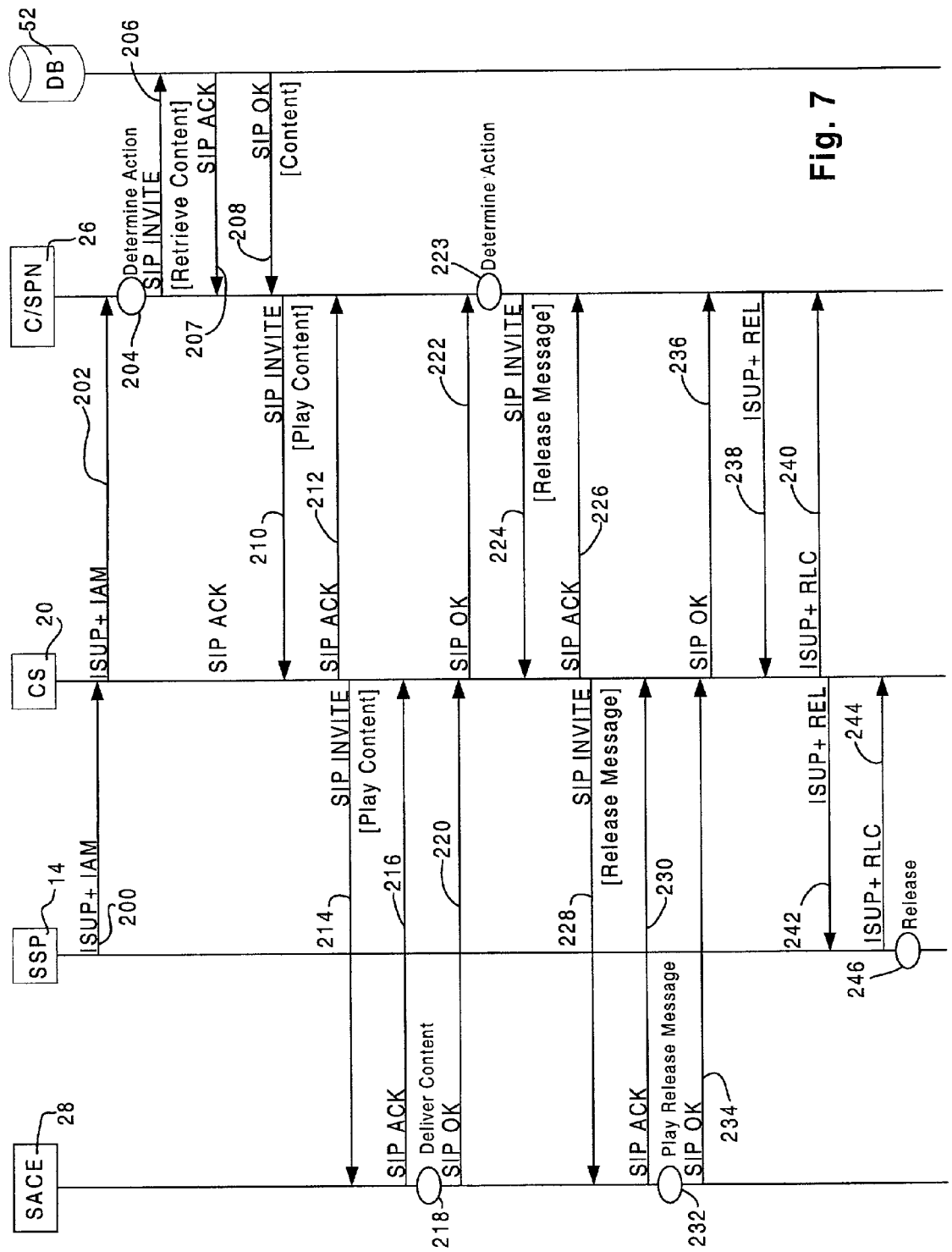
FIG. 7 is a message flow diagram of the principal messages exchanged in the provision of content to a subscriber using a system in accordance with the invention.

FIG. 7 is a message flow diagram showing principal messages exchanged between network elements while providing content to a subscriber using the methods and system in accordance with the invention. In step 200, a subscriber (not shown) dials digits, which prompts an SSP 14 that serves the subscriber to formulate an ISUP+ (BICC) IAM that is forwarded through the CCS network to CS 20. The CS 20 translates the dialed number and determines that the ISUP+ IAM should be forwarded to the C/SPN 26 (step 202). On receipt of the ISUP+ IAM, the C/SPN 26 translates the dialed number (step 204) and determines that the dialed number is associated with a content delivery to the subscriber. The content may be, for example, a weather forecast, an advertisement, music, entertainment, information, or any other audible content. In this example, the C/SPN 26 determines that the content to be delivered is an audio file that must be retrieved from database 52, and sends a request to retrieve content (step 206) from the database. The database 52 responds to the request with an Acknowledge message (step 207), followed by a SIP message containing the content in step 208. On receipt of the content, the C/SPN 26 formulates a SIP Invite message that contains the audio file and instructions to the SACE 28 to play the audio file to the subscriber, and transmits the Invite message to the CS 20 (step 210). The CS acknowledges the Invite message with a SIP ACK in step 212. The CS 20 forwards the SIP Invite message to the SACE 28 in step 214, and the SACE 28 returns an Acknowledgement in step 216. The SACE 28 then delivers the content to the subscriber by playing the audio file in step 218. After the content has been delivered, the SACE 28 returns a SIP OK message to the CS 20 in step 220. The CS 20 forwards a SIP OK message to the C/SPN 26 in step 222. On receipt of the message, the C/SPN 26 determines how the call should be terminated (step 223). In this example, the C/SPN 26 determines that the call should be terminated. The C/SPN 26 therefore formulates a SIP Release message having an appended Release message to be played by the SACE 28 to the subscriber, and forwards the SIP Release message to the CS 20 in step 224. The CS 20 responds with an Acknowledge message in step 226, and forwards the SIP Release message to the SACE 28 in step 228. On receipt of the message, the SACE returns a SIP Acknowledge message in step 230, and plays the Release message in step 232. When the message has been played, the SACE returns a SIP OK message to the CS 20 (step 234) and the CS 20 forwards the SIP OK message to the C/SPN 26 in step 236. The C/SPN 26 responds by sending an ISUP+ Release (ISUP+ REL) message to the CS 20 (step 238). The CS 20 responds with an ISUP+ Release Complete (ISUP+ RLC) message in step 240. The CS 20 then sends an ISUP+ REL message to the SSP 14 in step 242. The SSP 14 replies with an ISUP+RLC message in step 244. The SSP 14 then releases all resources associated with the call, including a bearer channel established to the SACE 28. The call is therefore terminated. As will be understood by those skilled in the art, the invention therefore enables content to be delivered to any subscriber served by an SACE 28 without completion of a call through the network or use of any switch or bearer trunk resources aside from the resources used between the subscriber and the SACE 28.

The methods and the system in accordance with the invention therefore enable content and service delivery to telephone subscriber much more economically and with a fraction of the infrastructure required by prior art systems. The number of services that can be implemented using the methods and system in accordance with the invention is limited only by the delivery medium.

The embodiment(s) of the invention described above is(are) intended to be exemplary only. The scope of the invention is therefore intended to be limited solely by the scope of the appended claims.

We claim:

1. A system for providing at least one of content and a service to telephone service subscribers, comprising:

a) a Content/Service Provision Node (C/SPN having a first interface with a call control messaging network and a second interface with a Content/Service Messaging Network (C/SMN), through which content/service messages are conveyed; and b) Subscriber Access Control Equipment (SACE), that can access a bearer channel of a subscriber line to deliver content or a service directly to the bearer channel of the subscriber line, wherein the delivery of at least one of content and a service is effected by the C/SPN with the SACE, in response to a call control message received by the C/SPN at the first interface, wherein call servers (CSs) communicate with the SACEs to relay messages between the C/SPNs and the SACE using the same protocol as used for the content/service messages.

2. A system as claimed in claim 1, wherein the CSs are adapted to relay at least a content of messages received from a respective SACE to an addressed C/SPN in a content/service message.

3. A system as claimed in claim 1, wherein the CSs are adapted to relay content/service messages to an addressed SACE, without interpreting, translating or modifying the messages, except to determine the addressed SACE.

4. A system as claimed in claim 1, wherein the CSs are also adapted to convert messages exchanged with the respective SACE into content/service messages exchanged with the C/SPN.

5. A method of enabling a content provider to provide at least one of content and a service to subscribers to a telecommunications network, said method comprising steps of:

a) enabling Call Servers (CSs) of the telecommunications network to exchange content/service messages with a Content/Service Provision Node (C/SPN) via a Content/Service Messaging Network (C/SMN);
b) provisioning the CSs to relay at least a content of respective content/service messages to addressed Subscriber Access Control Equipment (SACE), and vice versa; and
c) enabling the SACE to receive, process, and transmit at least the content of content/services messages, and, in response to receiving a content/service message, to perform an associated sequence of actions required to provide the at least one of content and a service by delivering the content or the service to the subscriber via direct access to a bearer channel of a subscriber line.

6. A method as claimed in claim 5, wherein the messages the CSs exchange with respective SACEs conform to the same protocol as the content/service messages.

7. A method as claimed in claim 6, wherein the step of provisioning the CSs to relay messages comprises enabling the CSs to determine the addressed SACE or C/SPN of a received message, and to forward the received message to the determined address.

8. A method as claimed in claim 5, wherein the content/service messages conform to Session Initiation Protocol (SIP).

9. A method as claimed in claim 5, wherein the content/service messages conform to Session Initiation protocol (SIP).

10. A method as claimed in claim 5, wherein the associated sequence of actions includes one of sending and receiving Pulse Code Modulated (PCM) data over a subscriber line specified in the content/service message.

11. A method as claimed in claim 10, wherein the PCM data comprises an announcement played.

12. A method as claimed in claim 10, wherein the PCM data comprises at least one of music, entertainment content, information content, and advertising content.

13. A method of providing extensible service features to telephone service subscribers, comprising a step of:
a) exchanging content/service messages between a Content/Service Provision Node (C/SPN) and Subscriber Access Control Equipment (SACE), wherein the content/service messages conform to a signaling protocol that permits:
 i) the delivery of an extensible payload, and
 ii) a separate component protocol, indicated in messages, to specify how at least one datum in one field of the message is to be processed; and
b) using the content/service messages to convey at least one of content and service information from the C/SPN to the SACE, which interfaces with the bearer channel of associated subscriber lines to deliver the content or service directly to the bearer channel of the subscriber lines.

14. A method of providing extensible service features to telephone service subscribers, comprising a step of: using a signaling protocol for exchanging signaling messages between a Content/Service Provision Node (C/SPN) and Subscriber Access Control Equipment (SACE) to deliver of an extensible payload of messages having an internal and separate component protocol contained in the messages to indicate how at least one datum in one field of the message is to be used to convey at least one of content and service information from an SACE that interfaces with a bearer channel of associated subscriber lines to deliver the content or service directly to the bearer channel of the subscriber lines.

15. A method as claimed in claim 13, wherein the variability of the size of the payload is enabled by payload extensions that can be appended to messages.

16. A method as claimed in claim 15, wherein the messages support multiple extensions.

17. A method as claimed in claim 15, wherein the messages support multiple types of extensions.

18. A method as claimed in claim 13 wherein the component protocol is a message description protocol identified within a header of messages, and the message description protocol provides information about the type of the message in which it is contained, and further indicates an intended processing of data in at least one of: a field, a payload section, and a payload extension contained in the message.

19. A method as claimed in claim 13, wherein the signaling protocol comprises a Common Channel Signaling (CCS) protocol.

20. A method as claimed in claim 13, wherein the communication of the at least one of content and service information is conveyed by a Broadband Transport Network (BTN) through which the SACEs also perform virtual trunking.

21. A method as claimed in claim 13, wherein the signaling protocol is Session Initiation Protocol (SIP).

22. A method as claimed in claim 21, wherein the message description protocol of the SIP messages is Session Description Protocol (SDP).

23. A method of enabling a Content/Service Provision Node (C/SPN) having an interface with each of a call control messaging network and a Content/Service Messaging Network (C/SMN), to control a remote interface with a bearer channel of a subscriber line to enable at least one of content information and service feature information to be exchanged with a subscriber, said method comprising steps of:
a) sending content/service messages via the C/SMN from the C/SPN to a Call Server (CS) associated with the subscriber line;
b) receiving the content/service messages at the CS and relaying control signaling messages to a Subscriber Access Control Equipment (SACE) having an interface with the subscriber line to control the SACE to deliver content or a service directly to the bearer channel of the subscriber line;
c) executing directives contained in the control signaling messages at the SACE to perform any one or more of: collecting information from the bearer channel and sending information through the bearer channel; and
d) returning to the C/SPN at least one of: information collected by the SACE, and information related to the status of the SACE.

24. A method as claimed in claim 23, wherein the information collected includes at least one of: a digit sequence; a type of information requested; an information pattern, and an information mask.

25. A method as claimed in claim 23, wherein the information sent through the bearer channel comprises announcements played to the user of the subscriber line to provide a service feature.

26. A method as claimed in claim 23, wherein the information sent through the bearer channel comprises at least one of: information content, advertisement, music, and entertainment content.

27. A method as claimed in claim 23, wherein the content/service messages comprise Session Initiation Protocol (SIP) messages.

28. A Content/Service Provision Node (C/SPN) comprising:
- a) a first interface with a common channel signaling network;
- b) a second interface with a Content/Service Messaging Network (C/SMN); and
- c) a processor adapted to receive and process call control messages received at the first interface, and content/service messages received at the second interface and perform at least one of: transmitting a call control message through the first interface; and transmitting a content/service message through the second interface; and
- d) the C/SPN, upon receipt of certain messages, maintains a status of, and executes a sequence of instructions to provide, at least one of content and a service to one or more telephone service subscribers.

29. A C/SPN as claimed in claim 28, wherein the C/SPN accesses any one or more of: a database; the Internet; an intranet; and an application sewer, in the provision of at least one of content and a service feature.

30. A C/SPN as claimed in claim 29, wherein the C/SPN responds to tall control messages as a stimulus to formulate and send content/service messages.

* * * * *